United States Patent Office 3,660,557
Patented May 2, 1972

3,660,557
POLYESTER PRODUCT
Walter J. Smith, Hopewell, Va., and John R. Bukey, Pottstown, Pa., assignors to The Firestone Tire & Rubber Company
No Drawing. Continuation of application Ser. No. 743,637, July 10, 1968, which is a division of application Ser. No. 483,318, Aug. 27, 1965. This application Nov. 12, 1970, Ser. No. 89,027
Int. Cl. D01d 5/12
U.S. Cl. 264—210
3 Claims

ABSTRACT OF THE DISCLOSURE

By incorporating by melt-blending certain diamides in predominantly polyester fiber-forming compositions, the fibers, filaments, yarn, cord, strapping and the like produced therefrom may be drawn at a draw ratio exceeding the draw ratio at break for the base polymeric material. The tensile strength of the product, as a result of the drawing operation, is greater than is obtainable from the base polymeric material. N,N'-ethylene bis-stearamide is a particularly suitable diamide for this purpose.

---

This application is a continuation of U.S. application Ser. No. 743,637, filed July 10, 1968, and now abandoned. Ser. No. 743,637 was a division of U.S. application Ser. No. 483,318, filed Aug. 27, 1965, and now abandoned.

This invention relates to polymeric materials having improved processability, to processes for rendering polymers of the polyester type more readily processable, and to bristles, filament, fiber, yarn, strapping, tire cord and the like products having improved properties.

In the production of articles such as yarn, cord, fiber, filament, strapping, etc., from materials of the polyester type, the products are subjected to stretching or drawing to increase their ultimate tensile strength. In general, the properties of such polymeric materials do not permit the use of high draw ratios, thereby limiting the final tensile strength obtainable in the products. Attempts to draw the products beyond certain limits adversely affects the quality of the product. Yarns which have been overdrawn, exhibit substantial filament breakage. Excessive drawing of strapping leads to a general deterioration of the physical properties and to breakage of the formed product.

It has now been found that the inclusion in the polymeric materials of certain diamide additives prior to, or during, melt extrusion or spinning improves the melt rheology such that a higher draw ratio can be employed than was previously possible. The resulting product has a substantially increased ultimate tensile strength and is generally of superior properties.

THE USEFUL DIAMIDES

The diamides useful for the purposes of the present invention are those having one of the following general structures:

(A)

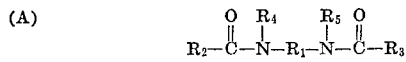

or (B)

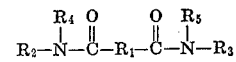

wherein:

$R_1$ is an alkylene group of from 2 to 12 carbons, preferably from 2 to 8 carbons, and may be straight or branched chain;

$R_2$ and $R_3$ are selected from the group consisting of alkyl, aralkyl and alicyclic groups containing from 2 to 30 carbons, either substituted or unsubstituted; the alkyl and alicyclic groups and the alkyl portion of the aralkyl groups may contain a minor degree of unsaturation; and $R_4$ and $R_5$ are selected from the group consisting of hydrogen, methyl and $R_2$ and $R_3$.

Thus, the diamides useful in the present invention can be prepared by the reaction of alkylene diamines and monocarboxylic fatty acids or by the reaction of dicarboxylic acids and alkyl monoamines. The amines which may be employed in the preparation of the diamides used in the present invention may be either primary or secondary amines. Typical diamines include ethylenediamine, propylenediamine, butylenediamine, hexamethylenediamine, octamethylenediamine, decamethylenediamine, dodecamethylenediamine, etc. Typical monoamines useful in the preparation of the diamides include ethylamine, methylethylamine, diethylamine, butylamine, hexylamine, decylamine, as well as the higher molecular weight monoamines containing up to 30 carbon atoms. Typical fatty acids useful in the production of diamides include caproic, caprylic, capric, lauric, myristic, palmitic, stearic, arachidic, behenic, tetracosanoic, cerotinic, montanic, carnubic, etc. Typical dicarboxylic acids useful in the production of diamides of the present invention include succinic, glutaric, adipic acid, pimelic, suberic, azelaic, sebacic, etc.

The total number of carbon atoms in the diamide, the degree and type of substitution, and the degree of unsaturation must be such that the basic waxy character of the additive and the thermostability of the additive are maintained at the temperatures and pressures encountered during the extrusion or spinning of the polymer to which they are added.

Similarly, the particular diamide employed should be selected such that it will not exert an undesirable effect on the polymer to which it is added. Thus, the additive must be chemically stable with the polymeric materials to which it is to be added under the various conditions encountered during processing and must not react in a manner or to an extent to degrade or destroy the basic nature of either the polymeric material or the additive. The additive must be dispersible in the polymer melt and must not be substantially volatilized at the processing temperatures and pressures.

An additional requirement of the additive is that it be relatively incompatible with the polymer to which it is to be added. This incompatibility can be demonstrated by mixing the additive with the monomers from which the polymer is to be prepared: when the polymerization reaction is carried out without agitation, the additive will separate from the polymeric reaction product.

There are several guides to assist in selecting a particular diamide for the purposes of the present invention. If the total carbon content of the diamide is too low, the diamide will lose its basic waxy characteristic. If the total number of carbon atoms is too high, the diamide will tend to lose its thermostability and become subject to serious oxidation. In general, the diamide should contain at least 34 carbon atoms.

In general, the diamides used in the present invention should have a relatively low vapor pressure at 500° F. If the diamide forms visible bubbles in the polymer filaments as they are extruded from the spinneret, the vapor pressure of the diamide is too high and a diamide having a lower vapor pressure should be employed.

The only serious limitation on the degree of unsaturation which can be tolerated in the various groups attached to the diamide is the requirement that the diamide be stable. Minor amounts of ethylenic unsaturation do not cause substantial loss of stability. On the other hand, diamide containing highly unsaturated alkyl groups are unsuitable for use in the present invention. In general, there should be no more than one ethylenic unsaturation in any R group, no more than four ethylenic unsaturations in the diamide, and no ethylenic unsaturations in any R group of less than six carbons.

Groups which may be substituted on the various carbon-containing groups are well known in the art. In general, sulfate groups should be avoided, since they will cause degradation of the polymer. A moderate number of alcoholic hydroxy groups can be substituted on the R groups.

Particularly suitable diamides are those of the ethylene bis-stearmide type. A typical useful diamide of this type is sold commercially as "Acrowax C." This product is N,N'-ethylene bis-stearamide. This diamide provides exceptional properties in polymers to which it is added. The preferred diamides are those in which $R_4$ and $R_5$ are hydrogen or methyl when $R_2$ and $R_3$ are $C_6$ and higher.

THE POLYMERIC MATERIALS

The polymeric material employed for the purposes of the present invention comprises at least 60%, and preferably at least 65 to 70%, of a polyester. The balance of the polymeric material may comprise other compatible polymers or may comprise block sections of other polymers. Thus the polymeric material may be all polyester, physical blends with other polymeric materials, as well as block polymers and physical blends of block polymers.

The polyesters useful in accordance with the present invention are those of the type produced by the linear condensation of polyhydric alcohols and benzenedicarboxylic acids, e.g., the phthalic acids. The invention is particularly useful with polyesters such as polyethylene terephthalate, polypropylene terephthalate, polyethylene isophthalate, polypropylene isophthalate, and blends and block polymers of the terephthalates and isophthalates.

As was noted above, it is not necessary that the predominant polymeric material, i.e., polyester, comprise uniform polymer macromolecules of a single polymer type. Block polymers of polyester may also be utilized, provided the total polyester sections of the marcomolecules are such that polyester comprise at least 60% of the polymeric material. However, up to about half of the polyester can be replaced by nylon without adverse effects. Thus, for example, polymeric material consisting entirely of block polymers of the type shown in Table I would be useful.

TABLE I

| Block polymer sections of macromolecule | Percent by weight of total block polymer macromolecule | | | |
|---|---|---|---|---|
|  | 1 | 2 | 3 | 4 |
| Polyester section | 50 | 60 | 30 | 50 |
| Nylon section | 50 |  | 30 | 10 |
| Other |  | 40 | 40 | 40 |

Typical of other polymeric materials which may form sections of polyester block polymers include the acrylics, e.g., polymethyl methacrylate, polyethyl methacrylate, polyethyl acrylate, etc., polyacrylonitrile and the polystyrenes, e.g., polystrene, polymethyl styrene, etc. The quantities of the various materials, which may be included with the polyester polymer, depend on the relative compatibilities of the materials.

In addition to the foregoing, physical blends of polyester with block polymers in which the polyester sections are less than 60% of the block polymer can be employed, provided that the total polyester content of the physical blend, including any corresponding block polymer sections, is at least 60% by weight. In addition to the block polymers and the block polymer blends, other useful polymeric materials include blends of polyester with compatible polymers including polyacrylonitrile, polycarbonates, such as that sold commercially as "Lexan" (General Electric), polyacrylates such as as polyethyl acrylate and polymethyl acrylate, polymethacrylates such as polymethyl methacrylate and polyethyl methacrylate, polystyrene, polymethyl styrene and polydivinyl styrene. Again, however, the total polyester content of the polymeric material must be at least 60% by weight. The only exception is in the circumstances mentioned previously in which up to half of the polyester can be replaced by nylon.

ADDITIVE DOSAGE

In general, the amount of additive included in the polymeric material may be as low as 0.005% in predominantly polyester product. In a polymeric material containing both nylon and a polyester, the amount of diamide included should be at least 0.1% by weight of the nylon content plus 0.005% by weight of the polyester content. In the case of a polymeric material which is essentially polyester based, the preferred additive dosage is 0.01% by weight.

METHODS OF INCORPORATING THE ADDITIVE IN THE POLYMERIC MATERIAL

The polymeric material in solid form may be dusted with the additive prior to melt extrusion or spinning. Subsequent melt extrusion or melt spinning satisfactorily blends the additive into the polymeric material to provide a substantially uniform and homogeneous product. Similarly, a melt of the additive may be blended into solid polymeric material. In addition, both the additive and polymeric material may be first melted and the two melts blended prior to the extrusion or spinning step.

The additive may also be dissolved in a fugitive or non-fugitive solvent. By the term "fugitive solvent" is intended those solvents which, during the course of processing of the polymeric material, will vaporize or otherwise be removed from the polymeric material. Typical of such solvents are methanol, acetone, ethylene glycol and dimethyl sulfoxide. Non-fugitive solvents must be selected such that their presence in the final polymeric product will in no way diminish the desirable properties of the polymeric material. Many such non-fugitive solvents actually enhance the properties of the final product. Typical of these are the intermediate molecular weight glycols and polyhydric alcohols, e.g., triethylene glycol, as well as solvents such as anilinoethanol, mineral oil, etc.

PRODUCTS

Polymeric material produced in accordance with the present invention may be suitably employed in the production of a number of useful products. All of the products are characterized as having been produced as the result of melt extrusion, melt spinning, with or without a subsequent drawing operation, or as the result of a melting operation followed by a drawing of the solidified product. Thus, in accordance with the present invention, bristles, filament, fiber, yarn and strapping have been satisfactorily produced from polymeric material of the present invention. It has been found possible to achieve superior properties in all of these products using the additive, as compared to these products from the same polymeric material without the additive.

EXAMPLES

In the examples which follow, the intrinsic viscosities given for polyester materials were determined with solutions containing 0.1 gram of polyester dissolved in 20 milliliters of a 1:1 mixture of phenol and tetrachloroethane.

In each instance, the yarn produced in accordance with the examples comprises 136 filaments of 0.001 inch diameter. All of the physical properties given refer to the yarn unless otherwise stated. Thus, tenacity given in the examples is the break strength in grams divided by the yarn denier. The ultimate elongation (U.E.) represents the percent elongation at break for the yarn. The 10 pound elongation (10#E) is the percent change from the initial length of the yarn when the yarn is subjected to a force of 10 pounds.

Examples 1 through 5

Polyethylene terephthalate of 0.84 intrinsic viscosity was spun into yarn in the usual manner. The dosage of Acrowax C varied for each of five batches. The properties of the resulting yarns are set forth in Table II.

TABLE II

| Example | Concentration of diamide in the polymer, wt. percent | Draw ratio | Denier | Tenacity, g./den. | Ultimate elongation, percent |
|---|---|---|---|---|---|
| 1 | .2 | 6.75 | 840 | 6.80 | 13 |
| 2 | .1 | 6.75 | 840 | 7.15 | 13 |
| 3 | .05 | 6.86 | 840 | 7.52 | 13.5 |
| 4 | .025 | 6.86 | 840 | 7.83 | 13.3 |
| 5 | .01 | 6.92 | 840 | 8.13 | 14.1 |

Untreated polymer could not be drawn with any degree of quality at draw ratios greater than about 6. When the concentration of the diamide exceeded 0.2%, the polymer was not readily processable.

As will be seen from the foregoing examples, the use of the specific class of diamides permits improvements in products produced from polyester materials with no loss in quality. Thus, it is possible to obtain an increase in tenacity of 0.5 to 1 gram per denier. The yarn exhibits better beaming performance, and a more uniform color is obtained in the beamed yarn.

While the invention has been illustrated in the foregoing examples with Acrowax C, the other diamides discussed previously are also useful. Thus, the several N,N'-alkylene bis-amides of fatty acids such as N,N'-alkylene bis-caproamide,
N,N'-alkylene bis-heptanamide,
N,N'-alkylene bis-capramide,
N,N'-alkylene bis-undecanamide,
N,N'-alkylene bis-lauramide,
N,N'-alkylene bis-myristamide,
N,N'-alkylene bis-palmitamide,
N,N'-alkylene bis-arachidamide,
N,N'-alkylene bis-behenamide,
N,N'-alkylene bis-oleamide, and
N,N'-alkylene bis-elaidamide may be used in place of Acrowax C.

The foregoing fatty acid diamides are particularly effective where the alkylene groups are ethylene, propylene, butylene, pentene, hexene, heptene and octene. While the higher alkylene groups are also useful in the manner described in the examples, they are primarily useful with the diamides of the lower molecular weight fatty acids. Thus, for example, while N,N'-dodecene[dodecamethylene]bis-stearamide can be used, the dodecene derivative is more effective in diamides such as N,N'-dodecene bis-caproamide.

For the purposes of the present invention, the preferred diamides are those having a structure resembling that of N,N'-ethylene bis-stearamide and containing about the same number of carbon atoms. These diamides may be defined as substantially linear diamides having an empirical formula $C_nH_{2n}N_2O_2$ wherein $n$ is an integer of from 34 to 42. By "linear" is meant that there is little, if any, branching from either the carbon or nitrogen atoms of the diamide, and such branching as there is, is of a short-chain type. The preferred diamides of this class are those which are substantially symmetrical, i.e., the diamides are prepared from only a single monocarboxylic acid or single monoamine, or where mixed monocarboxylic acids or mixed monoamines are employed, the difference in length between the carbon chains is no more than a few carbons, i.e., two or three carbons. While short hydrocarbon chains can also be attached to the nitrogens of the fatty acid diamides, e.g., methyl, ethyl and propyl, longer chain groups tend to reduce the effectiveness of the diamides.

Similarly, the diamides formed by the reaction of a dicarboxylic acid with fatty monoamines are also useful, particularly those resembling N,N'-ethylene bis-stearamide are useful. Thus, the diamide formed by reaction of succinic acid and hexylamine, heptylamine, octylamine, nonylamine, decylamine, etc., are useful as are the reaction products of these monoamines with glutaric acid, adipic acid, pimelic acid, suberic acid, azelaic acid, sebacic acid, etc. Diamides such as those obtained by the reaction of septadecylamine with succinic acid can be advantageously employed.

Any of these diamides can be used advantageously in the production of fibers, filaments, strapping, yarn, cord, etc., from polyesters, blends of polymers, block polymers and the like, as previously described. The components of the final products other than polyester (or polyester substitutes by nylon) should not exceed 40%, and in general, should be 20% or less.

The nylons which can be associated with the polyester, in accordance with the present invention, include any of Nylons-4 to 10, including particularly, Nylons-6 and 8, Nylon-66, Nylon-610, Nylon-6I and Nylon-6T. Typical nylons are identified below.

Nylon-4—polybutyrolactam
Nylon-5—polyvalerolactam
Nylon-6—polycaprolactam
Nylon-7—polyenantholactam
Nylon-6I—polyhexamethylene isophthalamide-adipamide
Nylon-6T—polyhexamethylene terephthalamide
Nylon-66—polyhexamethylene adipamide
Nylon-610—polyhexamethylene sebacamide When a nylon is included in the composition, diamide should be incorporated to compensate for the nylon characteristics as well. Under such circumstances, therefore, the effective amount of diamide comprises in the aggregate from about 0.005% up to about 0.1% by weight of the total polyester content of the melt-blended polymeric material and from about 0.1% up to about 1% by weight of the total nylon content of the melt-blended polymeric material.

What is claimed is:

1. A method for the production of filament, fiber, yarn, cord, strapping and like products of improved tensile strength comprising melt-blending a polymeric material consisting essentially of a linear fiber-forming polyethylene terephthalate, and an effective amount of from 0.005% up to about 0.1% by weight of a diamide selected from the group consisting of (a) 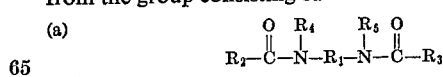

and (b) 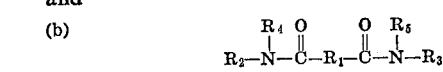

wherein:

$R_1$ is an alkylene group of from 2 to 12 carbons,
$R_2$ and $R_3$ are separately selected from the group consisting of alkyl, aralkyl and alicyclic groups free from substantial ethylenic unsaturation and containing from 2 to 30 carbons, and $R_4$ and $R_5$ are separately selected from the group consisting of hydrogen, methyl, $R_2$ and $R_3$
melt-spinning the melt-blended polymeric material to form said product and drawing the product of the melt-blending and spinning steps at a draw ratio exceeding 6.0:1.

2. Method according to claim 1, wherein the draw ratio is in the range from 6.75:1 to 6.92:1.

3. Method according to claim 2 wherein said diamide is N,N'-ethylene bis-stearamide.

References Cited

UNITED STATES PATENTS 2,996,466  8/1961  Kessler ------------ 264—211

MORRIS LIEBMAN, Primary Examiner

P. R. MICHL, Assistant Examiner

U.S. Cl. X.R.

260—28; 264—211